Figures 1, 2, 3:
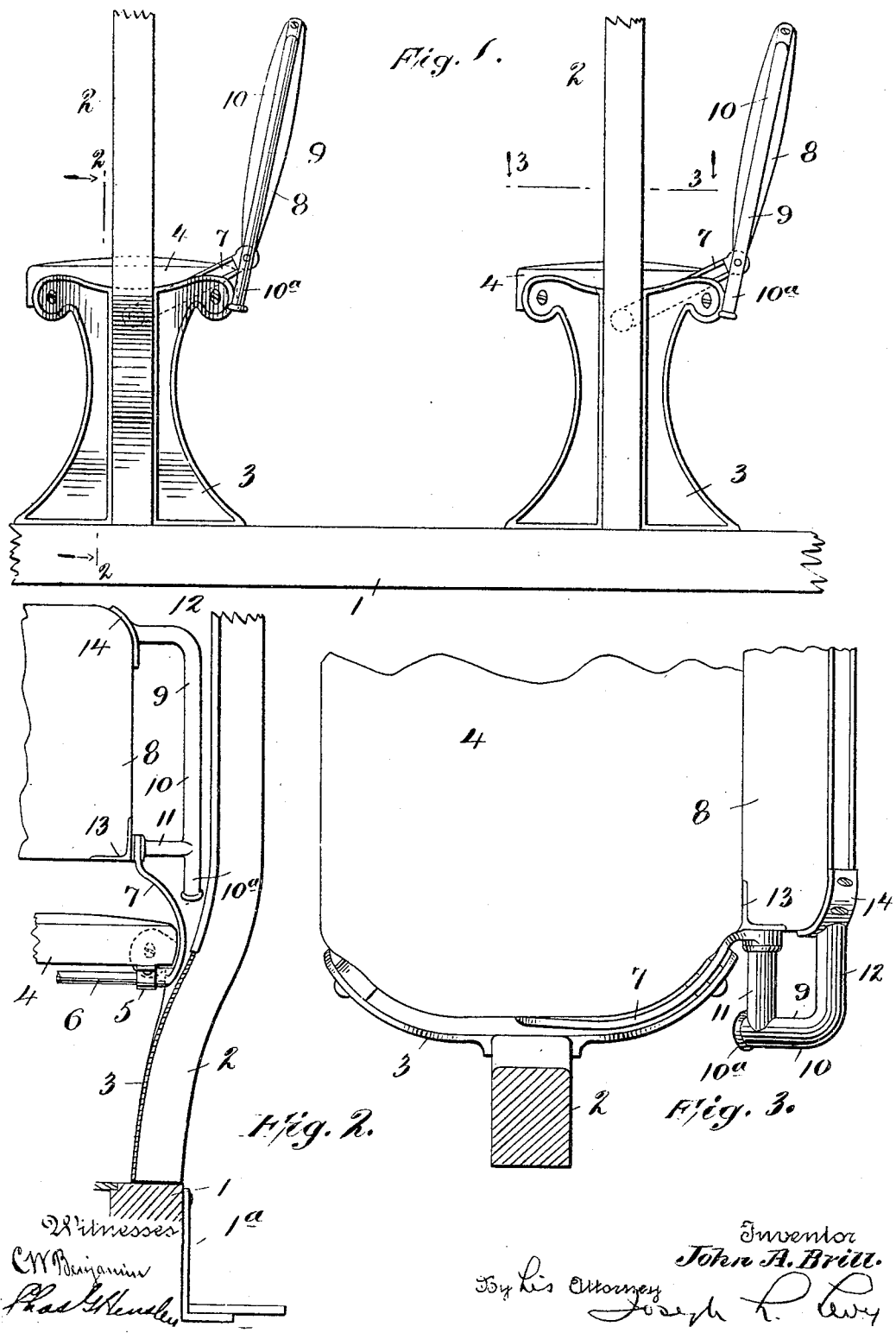

No. 800,715. PATENTED OCT. 3, 1905.
J. A. BRILL.
GRAB HANDLE FOR OPEN CARS.
APPLICATION FILED AUG. 29, 1903.

2 SHEETS—SHEET 1.

Witnesses
C. W. Benjamin
Chas. G. Hendley

Inventor
John A. Brill.
By his Attorney
Joseph L. Levy

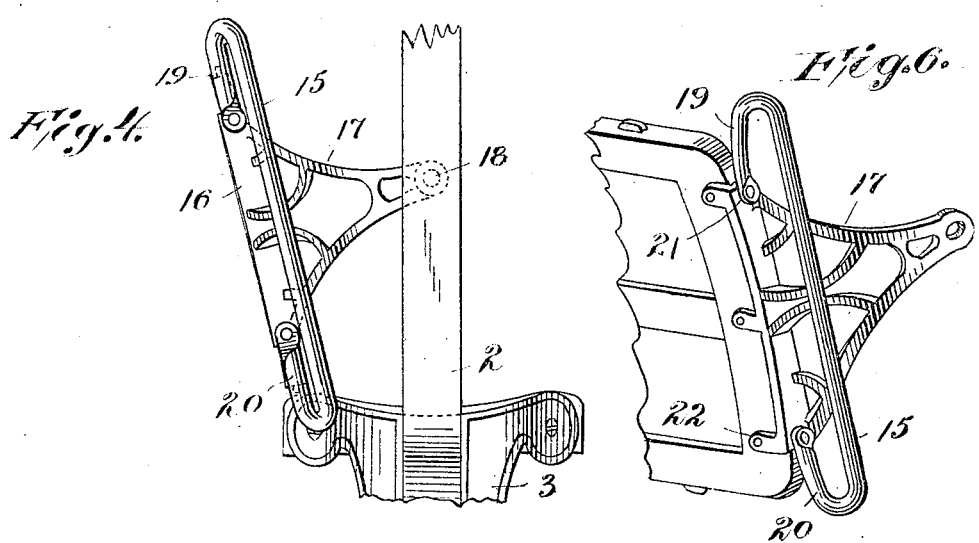
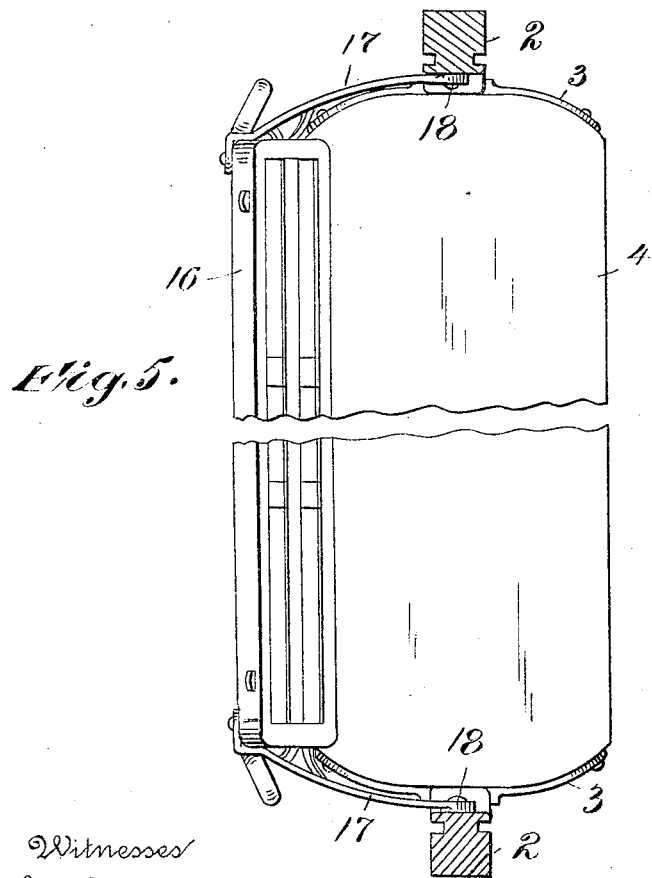

UNITED STATES PATENT OFFICE.

JOHN A. BRILL, OF PHILADELPHIA, PENNSYLVANIA.

GRAB-HANDLE FOR OPEN CARS.

No. 800,715. Specification of Letters Patent. Patented Oct. 3, 1905.

Application filed August 29, 1903. Serial No. 171,229.

*To all whom it may concern:*

Be it known that I, JOHN A. BRILL, a citizen of the United States, and a resident of the city and county of Philadelphia, State of Pennsylvania, have invented a new and useful Improvement in Grab-Handles for Open Cars and the Like, of which the following is a specification.

The cars of this description now universally in use have grab-handles secured to the stanchions and running parallel therewith on the outside of the car and protruding therefrom a considerable distance. This is very inconvenient to the conductors and others passing along the running-board, because they are obliged to lean way out to clear these handles. This leaning becomes very tedious because of its frequent repetition. Furthermore, this structure is dangerous to passengers, particularly women and children, because when they are getting on a car they have to release the handle before passing the stanchions—that is, before they get in the car—so that when the car starts they are often thrown from their feet and injured, and when getting off the car they almost invariably grasp the handle in line with the seat they have vacated, so that when getting off the car they face to the rear, so that when the car is started prematurely, as often happens in practice, they are thrown with violence to the ground and injured. They seldom grasp the handle opposite the seat in front, because that is generally rendered inaccessible by the passenger next the stanchion on that seat, so that the habit is formed of grasping the handle as above set forth, and because the habit is formed it is persisted in.

The object of my invention is to overcome all these difficulties, and this I accomplish by attaching the grab-handles to the ends of the backs of the seats where the handles are easily reached either while in or out of a car, and yet only the right one may be grasped, so that all danger of the passenger facing the rear when getting off is obviated. As the grab-handles are well within the car, they cannot interfere with the conductor on the running-board.

For a more particular description of certain embodiments of my invention reference is to be had to the accompanying drawings, forming a part hereof, in which—

Figure 1 is a side elevation of a portion of a car provided with my improvements applied to the back of a walkover-seat. Fig. 2 is a section taken on the line 2 2, Fig. 1, looking in the direction of the arrows. The back lines show in its central position while being reversed. Fig. 3 is a section taken on the line 3 3 of Fig. 1 looking in the direction of the arrows, the back being shown in its middle position. Fig. 4 shows my improvement applied to an ordinary reversible seat. Fig. 5 is a plan view of the same. Fig. 6 is a perspective view of a portion of the same.

Throughout the various views similar reference characters designate similar parts.

A car embodying my improvement is provided with the usual side sills, from which extend the stanchions 2 to which the seat-panels 3 are attached. The sills are provided with running-boards 1ª as is usual in such constructions. When the seat is a walkover one, as shown in Figs. 1, 2, and 3, the seat-cushion 4, which is supported by the panels 3, is provided with a depending bracket 5, through which passes a rod 6, which has an arm 7 fixed thereto, the upper part of which is upwardly and inwardly curved to the end which is pivoted to the back 8. As this particular form of seat-back forms the subject-matter of an application of Samuel M. Curwen, filed October 29, 1903, bearing Serial No. 179,105, further description is considered unnecessary. Moreover, as my improvement may be applied to any suitable seat with a frame supporting the same, the precise form is immaterial.

The arm 7 is sufficiently curved to make the back 8 clear the stanchion 2, so that the grab-handle 9 may be secured to the end of the back 8 and not interfere with the said stanchions when the seat is reversed.

The grab-handle 9 comprises the handle 10, which runs parallel to the outer edge of the back 8 and is secured thereto by means of a stud 11, to which the arm 7 is pivoted, and the bent end 12. The stud 11 has an integral angle-plate 13, which is screwed or otherwise suitably secured to the lower edge of the back 8 as well as the end thereof, and the end 12 is similarly secured at the top corner by means of a curved plate 14, formed integral with the handle. This handle 10 is also formed with a projecting end 10ª, which extends below the stud 11, and as far as possible without interfering with the arm 7 when the back occupies the position shown in Fig. 3.

In Figs. 4, 5, and 6 I have shown my improved handle 15 applied to an ordinary reversible back 16, which is fixed to the radial arm 17, that is pivoted at 18 to the stanchion 2. This handle 15 has ends 19 and 20, which are bent parallel to the handle proper and at one side thereof and secured at 21 and 22 and to the back 16.

In either of the structures described above when leaving a car a passenger must grasp the grab-handle in line with the seat in front of him if he grasps any, because he can reach no other.

This invention is particularly applicable to convertible cars, as in this type it is undesirable to have the grab-handles protude from the stanchions, especially when the car is closed for winter service. This objection is entirely obviated by placing the grab-handles on the backs of the seats, as indicated above.

It is obvious that while I have shown two embodiments of my invention, it may be modified indefinitely without sacrificing any of its advantages, and that its precise form must be varied in the exigencies of service. For this reason I do not consider my invention as limited to these structures, but regard all as equivalents that come within the scope of the annexed claims.

What I claim is—

1. A reversible seat with a handle extending substantially throughout the length of the end of its back.

2. A reversible seat with a handle extending throughout and beyond the end edge of the back.

3. In an open car or similar vehicle, a frame with stanchions, seats with backs, and grab-handles secured to said backs and extending from their outer ends and in the plane thereof and adjacent to said stanchions.

4. In an open car or similar vehicle, a frame with stanchions, seat-panels with seats secured to said stanchions, backs secured to said seats and grab-handles fastened to said backs within the outer line of the car and extending from the outer ends of said backs and in the plane thereof, and adjacent to said stanchions.

5. In an open car or similar vehicle, a frame with stanchions and reversible seats and grab-handles secured to the backs of said seats, and extending outwardly from said backs and in the planes thereof, and adjacent to said stanchions, so as to assist passengers in getting on or off the car.

6. In an open car or similar vehicle, a frame with stanchions, seat-panels secured to said stanchions, reversible seats with backs and grab-handles secured to said backs and extending outwardly therefrom within the plane thereof and adjacent to said stanchions.

7. In an open car or similar vehicle, stanchions, seats within the space between said stanchions, backs secured to said seats and grab-handles secured to said backs and extending outwardly from the outer edges of said backs and in the planes thereof and adjacent to said stanchions.

8. In an open car or similar vehicle, stanchions, seats with frames, backs pivoted to swing from said frames and grab-handles secured to said backs and extending outwardly therefrom and in the planes thereof and adapted to rest between posts.

9. In an open car or similar vehicle, stanchions, seats with frames, backs pivoted to swing from said frames, and grab-handles secured to the outer edges of said backs and in the planes thereof and adapted to rest between said stanchions.

10. In a street-car or similar vehicle, stanchions, seats with frames, backs pivoted to swing from said frames, and grab-handles secured to the outer edges of said backs and in the planes thereof, and adapted to rest between said stanchions, and swing by said stanchions when the seats are reversed.

11. In an open car or similar vehicle, stanchions, seats within the spaces between said stanchions and grab-handles secured to the outer ends of said seats and in the planes of the backs thereof, and adapted to swing by said stanchions when the seats are reversed.

Signed in the city and county of Philadelphia, State of Pennsylvania, this 27th day of August, 1903.

JOHN A. BRILL.

Witnesses:
 WM. J. FERDINAND,
 TERRENCE McCUSKER.